Dec. 7, 1943.  R. H. DALTON  2,336,227
METHOD OF MAKING SEALING GLASSES
Filed July 20, 1940
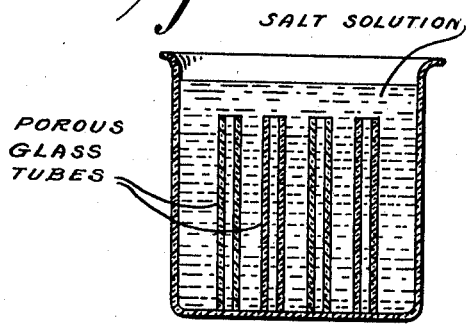
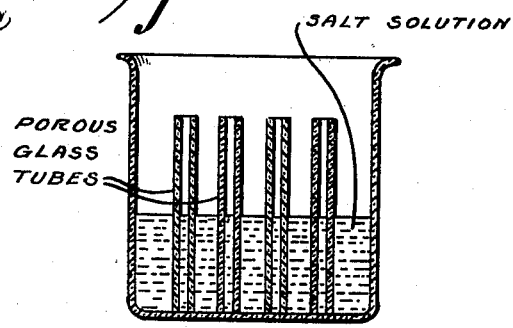
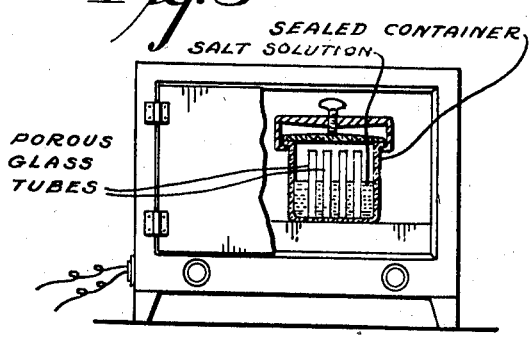
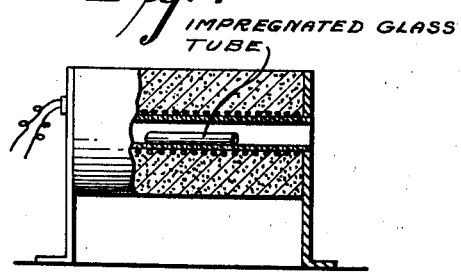
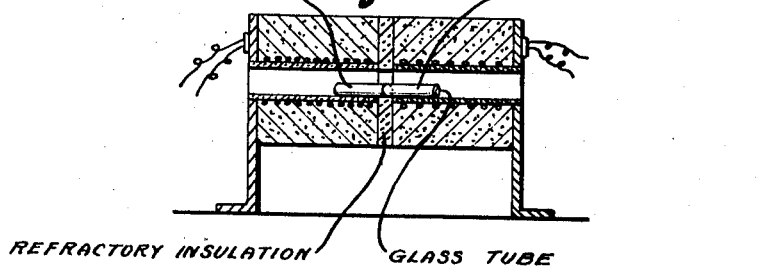
Inventor
ROBERT H. DALTON
By
F. H. Knight
Attorney Patented Dec. 7, 1943

2,336,227

UNITED STATES PATENT OFFICE 2,336,227

METHOD OF MAKING SEALING GLASSES

Robert H. Dalton, Corning, N. Y., assignor to Corning Glass Works, Corning, N. Y., a corporation of New York Application July 20, 1940, Serial No. 346,659

6 Claims. (Cl. 49—79)

This invention relates to glasses which are suitable for forming thermal seals between fused silica and metals or between fused silica and other glasses. Such glasses should have expansion coefficients ranging preferably from about .0000010 to .0000025. Since the parts adjacent the silica may be subjected in service to temperatures as high as 1000° C., it is preferable that such glasses have softening points in excess of this temperature in order to avoid deformation. They are therefore difficult to manufacture since an excessively high temperature is required to melt them and proper fining is accomplished only by melting in a substantial vacuum. These requirements necessitate the use of special refractories and furnaces and prohibit operations on a large scale. Moreover, on account of their hard and viscous character at high temperatures, it is very difficult and expensive to fabricate these glasses into tubing although it is highly desirable to provide them in the form of tubing to facilitate the forming of beaded seals on lead-in wires for lamps and other electrical apparatus, and for making graded seals.

The primary object of this invention is to produce highly refractory quartz sealing glasses without resort to vacuum melting or the use of high temperatures.

Another object is a simple and easy method of producing tubing composed of glass having an annealing temperature in excess of 750° C., a softening temperature above 1000° C., and a thermal expansion coefficient between .0000010 to .0000025.

A further object is to produce a graded seal which possesses a different expansion coefficient in different portions thereof and which is free from intermediate joints or welds. In this embodiment expansion and annealing points comparable to those of ordinary glass are necessary at one end of the seal.

Still another object is to produce as a unit, which is free from joints or welds, a lamp bulb composed of a low expansion highly refractory glass and having tubulations of higher expansion for sealing electrodes therein.

The above and other objects may be accomplished by practicing my invention which embodies among its features melting and fabricating a glasss, separating the glass into two phases throughout its mass by a heat treatment, dissolving out one of the phases while leaving the other phase undissolved in a rigid, porous structure, impregnating at least a part of the porous structure with a compound which on heating will form a colorless glass forming oxide and firing the structure to close the pores and incorporate the oxide into the glass.

In the prior Patent 2,106,744, issued February 1, 1938, to Harrison P. Hood and Martin E. Nordberg, there is shown a method of making a porous, highly siliceous glass, which comprises melting an easily meltable glass, forming an article therefrom and heat treating it to cause throughout its mass a molecular rearrangement resulting in the formation of two interdispersed compositions which, for lack of a more accurate term, are herein referred to as phases. One phase is highly siliceous and substantially insoluble. The other is soluble in acids and is thereafter leached out leaving a rigid, porous structure having the same shape as the initial article. Such an article is of uniform character throughout and its physical properties closely approximate those of fused silica, the coefficient of expansion being .0000008 per degree C.

I have discovered that the above described porous structure can be impregnated in whole or in part with certain glass forming oxides or compounds from which they may be produced, and thereafter fired without change of shape to form a transparent glass article which has a totally different composition than the original article and in which the said glass forming oxides are apparently homogeneously incorporated as a part of the composition. My invention, therefore, provides an easy and convenient method of producing articles such as tubing having compositions which are extremely difficult if not impossible to melt and fabricate by the usual methods. The invention further provides a novel method of making graded seals or other articles which contain more than one type of glass, as will later appear.

In order that my invention may be better understood reference is had to the accompanying drawing in which is illustrated the simplest embodiment of the invention and in which Fig. 1 is a sectional view of a glass beaker containing a solution of a salt or salts in which are immersed short lengths of porous glass tubing which are to be impregnated in accordance with my invention.

Fig. 2 is a sectional view of a glass beaker with contents similar to that shown in Fig. 1 but in which the porous glass tubes are only partly immersed in order to produce a graded seal in accordance with my invention.

Fig. 3 is a side view partly in section of an oven in which a sealed container is disposed for the purpose of heating it. The container in its simplest embodiment as illustrated comprises a glass pressure jar with cover and hold-down clamp. Within the jar is a solution containing a volatile salt and partly immersed therein are a number of porous glass tubes to be impregnated.

Fig. 4 is a sectional view of a tubular electrical resistance furnace showing an impregnated porous glass tube disposed therein for firing.

Fig. 5 is a sectional view of a gradient furnace having zones of different temperature separated by refractory insulation and containing in position for firing a porous glass tube one end only of which has been impregnated for the purpose of a graded seal.

In the practice of my invention the above described porous glass in any desired shape is impregnated by immersing it or a part of it in a solution containing a salt or compound of an element, the oxide of which is to be incorporated therein as shown in Figs. 1 and 2. The percentage of oxide to be incorporated may be controlled by varying the concentration of the treating solution. By knowing the composition, density and porosity of the porous glass, the concentration of the solution necessary to produce any desired final glass may be calculated. The porosity of the porous glass may be determined by the usual methods and in general amounts to about 35%. Highly soluble compounds are preferably employed and the solution is heated, if necessary, to increase the solubility. Some compounds tend to volatilize when their solutions are heated and in order to prevent this and to maintain the desired high concentration such solutions are enclosed in a sealed container during the impregnating step as shown by way of example in Fig. 3.

By way of example, boric acid is not very soluble and not more than about 1% of $B_2O_3$ can be incorporated into the glass by using this solution. Ammonium borate, although more soluble than boric acid, produces a solution which when cold has a $B_2O_3$ content insufficient for some purposes. A solution of this compound decomposes on heating, but in a sealed container the solution can be heated without decomposition and the concentration of $B_2O_3$ in the solution is thereby appreciably increased. These concentrations are sufficient to materially affect the properties of the resulting article. When a porous tube was immersed in a solution containing 48 grams of boric acid, 21 cc. of concentrated ammonium hydroxide (28%) and 30 cc. of water in a sealed container and heated to 80° C., the resulting glass after firing had an expansion coefficient of about .00000145. The expansion of the glass before impregnation would have been about .0000008.

A plurality of oxides may be incorporated from a single solution if the salts or compounds employed do not coprecipitate. For example, a solution containing 62 grams of boric acid, 31 cc. of concentrated ammonium hydroxide (28%) and 6.2 grams of potassium pentaborate (16.1% $K_2O$, 59.5% $B_2O_3$) per 100 cc. of solution, when heated to 80° C. in a sealed container with the porous glass immersed therein, produced a glass which, when fired, had an expansion coefficient of about .00000178. This glass, when tested, possessed an electrical resistance ten times as great as one of the best prior sealing glasses comprising 83% $SiO_2$, 13% $B_2O_3$ and 4% $Al_2O_3$ and made by melting a batch in a vacuum furnace. Since the glass made by the new method contained added potash which would ordinarily lower the resistance, the reason for the difference cannot be stated.

As a further example, a glass having an expansion of .0000031 per degree C. was obtained by impregnating the porous glass with a solution containing 69.5 grams of borax, 28.4 grams of boric acid and 100 cc. of water and heated to 90° C.

In order to incorporate a plurality of oxides the impregnating solutions of which will coprecipitate if mixed, it is necessary to impregnate the porous glass articles with each solution individually, the article being dried following each impregnation. For example, in order to incorporate both $B_2O_3$ and $BaO$ into the glass, the porous article was first immersed in a solution containing 8.54 grams of barium nitrate per 100 cc. and after thorough soaking therein was dried. The article was then placed in a solution containing 62 grams of boric acid and 30 cc. of concentrated ammonium hydroxide (28%) per 100 cc. of solution in a sealed container and the whole was heated to about 90° C. The resulting glass after firing had an expansion coefficient of about .00000167 per degree C.

After porous glass articles have been impregnated as above described, they are dried and fired slowly to a temperature sufficient to close the pores and convert the impregnated glass to a substantially homogeneous vitreous body as illustrated in Fig. 4. Since the temperature at which this will occur will vary with the oxide or oxides introduced, no definite temperature for firing can be stated but it may readily be determined by trial. In every instance it will be found to be materially lower than the temperature required to melt and fine a glass of equivalent composition directly from batch materials.

By the present invention a glass article having a different expansion coefficient in different portions thereof in the manner of the so-called graded seals can be made. For example, in a solution containing 16.65 grams of potassium pentaborate, 29.97 grams of boric acid and 26 cc. of concentrated ammonium hydroxide per 100 cc. of solution in a sealed container heated at 90° C., a tube of porous glass was placed so that one end thereof was immersed in the solution. After being subsequently dried and fired, the end of the tube which had been impregnated had an expansion coefficient of about .00000205 and could successfully be sealed to a well known low expansion borosilicate glass having an expansion coefficient of about .0000032. The unimpregnated end of the tube had had an expansion coefficient of about .0000008 and formed a successful seal with pure silica. No substantial strain was visible in any portion of the tube, indicating that the transition from one expansion to the other was continuous. Moreover, unlike prior graded seals having a plurality of welds and showing strain at each weld, such a tube contains no intermediate joints or welds but is a single unitary article throughout its length. It is therefore both thermally and mechanically stronger than the prior graded seals.

A further advantage of the new method resides in its application to the production of lamp bulbs or tubes for high pressure mercury arc lamps. Such lamps operate at an elevated temperature and require a glass of high softening temperature similar to silica and a sufficiently low expansion coefficient to insure resistance to thermal shock. At the same time, the bulb must be provided with tubulations of higher expansion for the sealing in of tungsten electrodes or lead-in wires. Heretofore it has been necessary to attach the tubulations by means of graded seals comprising one or more intermediate glasses. By the new method a lamp bulb having tubulations as an integral part thereof may be initially formed in toto of a porous high silica glass in accordance with the method described in the above mentioned prior patent. The tubulations may then be impregnated as described above while leaving the bulb untreated, after which the entire article is fired. This results in a bulb having an expansion coefficient and softening temperature in the neighborhood of those of pure silica and provided with tubulations as an integral part thereof having an expansion coefficient suitable for sealing with the beaded tungsten wire.

In making articles of variable expansion where the difference between the expansion of the impregnated glass and the unimpregnated glass is great enough to cause objectionable strain, it is desirable to employ two or more impregnations, in which the article is dipped a shorter distance each time, and is dried after each dip. If desired, consecutively stronger solutions may be employed or the composition of the solutions may be varied to introduce into the glass other or additional oxides which will have an increasingly greater effect upon raising the expansion coefficient of the final glass.

In firing graded seals or other similar articles made by my process, it is necessary to employ differential or gradient heating. The temperature required for firing the impregnated portions of the articles being lower than that required for firing the unimpregnated portions, it is desirable to avoid heating the former at the temperature required by the latter so as to avoid deformation of the former. For this purpose such articles may be fired in a gradient furnace in which different portions are heated to the different temperatures required as shown in Fig. 5. As an alternative, such articles may be fired by passing them through a flame while being rotated, the temperature of the flame and/or the time the article is subjected thereto being varied to produce the desired heating effect.

Inasmuch as some of the glasses made by my process may have an objectionable tendency to bubble if reworked in a flame at a temperature above that used in firing as a result of gases occluded in the glass, it is sometimes advantageous when firing such glasses to employ a vacuum furnace.

I claim:

1. The method of making a glass which comprises melting and fabricating a glass, separating it into two phases throughout its mass by a heat treatment, dissolving out one of the phases while leaving the other phase undissolved in a rigid porous structure, immersing at least a portion of the porous glass in a solution containing a boron compound in a sealed container, heating the container, removing and drying the treated glass, and firing the glass to close the pores and incorporate the boron into the glass.

2. The method of making a refractory glass which comprises melting and fabricating a glass, separating it into two phases throughout its mass by a heat treatment, dissolving out one of the phases while leaving the other phase undissolved in a rigid porous structure, immersing at least a portion of the porous glass in a solution containing a barium salt, removing and drying the treated glass, immersing the glass in a solution containing a boron compound in a sealed container, heating the container, removing and drying the treated glass, and firing the glass to close the pores and incorporate the barium and boron into the glass.

3. The method of making a refractory glass which comprises melting and fabricating a glass, separating it into two phases throughout its mass by a heat treatment, dissolving out one of the phases while leaving the other phase undissolved in a rigid porous structure, immersing at least a portion of the porous structure in a solution containing potassium pentaborate, boric acid and ammonium hydroxide in a sealed container, heating the container and its contents, removing and drying the treated glass and firing it to close the pores and incorporate the potassium and boron into the glass.

4. The method which comprises melting a glass, separating it into two phases throughout its mass by a heat treatment, dissolving out one of the phases while leaving the other phase undissolved in a rigid porous structure, immersing at least a part of the porous structure in a solution containing a compound of a colorless glass-forming oxide in a sealed container, heating the container and its contents, drying the treated glass and firing it to close the pores and incorporate the oxide into the glass.

5. The method of making a graded seal which comprises melting and fabricating a glass, separating it into two phases throughout its mass by a heat treatment, dissolving out one of the phases while leaving the other phase undissolved in a rigid porous structure, immersing a part of the porous structure in a solution containing potassium pentaborate, boric oxide and ammonium hydroxide in a sealed container, heating the container and its contents, drying the treated glass, firing the impregnated part at one temperature to close the pores and incorporate the potassium and boron into the glass, and firing the unimpregnated part at a higher temperature.

6. The method of making a graded seal which comprises melting a glass, separating it into two phases throughout its mass by a heat treatment, dissolving out one of the phases while leaving the other phase undissolved in a rigid porous structure, immersing a part of the porous structure in a solution containing a compound of a colorless glass-forming oxide in a sealed container, heating the container and its contents, drying the treated glass, firing the impregnated part at one temperature to close the pores and incorporate the oxide into the glass, and firing the unimpregnated part at a higher temperature.

ROBERT H. DALTON.